United States Patent
Tobe et al.

(10) Patent No.: US 8,539,509 B2
(45) Date of Patent: Sep. 17, 2013

(54) EVENT QUEUE MANAGING DEVICE AND EVENT QUEUE MANAGING METHOD

(75) Inventors: Akiko Tobe, Yokosuka (JP); Nirou Tsuchiya, Yokohama (JP); Masayuki Tsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/126,580

(22) PCT Filed: Oct. 28, 2009

(86) PCT No.: PCT/JP2009/068481
§ 371 (c)(1),
(2), (4) Date: Jul. 8, 2011

(87) PCT Pub. No.: WO2010/050498
PCT Pub. Date: May 6, 2010

(65) Prior Publication Data
US 2011/0265099 A1    Oct. 27, 2011

(30) Foreign Application Priority Data
Oct. 30, 2008    (JP) ................................ P2008-280251

(51) Int. Cl.
*G06F 9/48* (2006.01)
*G06F 9/54* (2006.01)
(52) U.S. Cl.
USPC .......................................... 719/314; 719/318
(58) Field of Classification Search
None
See application file for complete search history.

(56) References Cited

U.S. PATENT DOCUMENTS

| | | | |
|---|---|---|---|
| 5,721,825 A | 2/1998 | Lawson et al. | |
| 5,961,650 A | 10/1999 | Arendt et al. | |
| 6,185,613 B1 | 2/2001 | Lawson et al. | |
| 8,356,301 B2 * | 1/2013 | Wu et al. | 718/100 |
| 2003/0014558 A1 * | 1/2003 | Amamiya et al. | 709/318 |
| 2004/0128670 A1 * | 7/2004 | Robinson et al. | 718/1 |

(Continued)

FOREIGN PATENT DOCUMENTS

| | | |
|---|---|---|
| JP | 4-345248 | 12/1992 |
| JP | 8-204756 | 8/1996 |

(Continued)

OTHER PUBLICATIONS

International Preliminary Report on Patentability and Written Opinion issued Jun. 16, 2011 in Application No. PCT/JP2009/068481.

(Continued)

*Primary Examiner* — H S Sough
*Assistant Examiner* — Umut Onat
(74) *Attorney, Agent, or Firm* — Oblon, Spivak, McClelland, Maier & Neustadt, L.L.P.

(57) ABSTRACT

An event queue managing module that prevents unnecessary events from continuously executing applications when an application execution environment resumes from a suspended state, and including: a queue managing unit for storing event objects reported from an event detector of a basic software unit into an event queue in order of occurrence of events and managing their queue; an event classification detection unit for detecting the event classification and parameter of the event objects whose queue is managed by the queue managing unit; a stop state detection unit for detecting a stop state of an application execution environment; and an event deletion unit for deleting an unnecessary event from the event objects stored in the event queue when the application execution environment is in the stop state.

3 Claims, 5 Drawing Sheets

(56) References Cited

U.S. PATENT DOCUMENTS

| | | |
|---|---|---|
| 2005/0002057 A1 | 1/2005 | Oe |
| 2005/0003850 A1* | 1/2005 | Tsuda et al. ............... 455/550.1 |
| 2007/0240169 A1 | 10/2007 | Surlaker et al. |

FOREIGN PATENT DOCUMENTS

| | | |
|---|---|---|
| JP | 10-3393 | 1/1998 |
| JP | 2000-207234 | 7/2000 |
| JP | 2003-285285 | 10/2003 |
| JP | 2003 285285 | 10/2003 |
| JP | 2004-287755 | 10/2004 |
| JP | 2005-102133 | 4/2005 |
| JP | 2005 102133 | 4/2005 |
| JP | 2005-284904 | 10/2005 |
| JP | 2006-163612 | 6/2006 |
| JP | 2006 163612 | 6/2006 |
| JP | 2007-48094 | 2/2007 |
| JP | 2007 48094 | 2/2007 |
| WO | WO 97/34219 A1 | 9/1997 |

OTHER PUBLICATIONS

Office Action issued Feb. 2, 2010 in Japan Application No. 2008-280251 (With English Translation).

Office Action issued Jan. 18, 2011 in Japan Application Nc. 2008-280251 (With English Translation).

International Search Report issued Jan. 12, 2010 in PCT/JP09/68481 filed Oct. 28, 2009.

Extended European Search Report issued Apr. 25, 2012, in European Patent Application No. 09823608.6.

Combined Chinese Office Action and Search Report issued Feb. 1, 2013 in Chinese Patent Application No. 200980143279.6 (with English-language translation).

* cited by examiner

EVENT QUEUE MANAGING DEVICE AND EVENT QUEUE MANAGING METHOD

TECHNICAL FIELD

The present invention relates to an event queue managing device and an event queue managing method which manage a queue of events.

BACKGROUND ART

Queue managing devices which manage a queue of a large amount of events when such events occur have conventionally been known (see, for example, Patent Literature 1). When such a huge amount of events as to exceed the processing load of a system occur, the conventional queue managing devices delete queues failing to satisfy predetermined criteria from events stored in an event queue, thereby preventing load from increasing drastically.

In internal software processing of computers and mobile compact information terminals, on the other hand, there are cases where signals are transmitted between software modules by using an event delivery system model or the like. For example, when an event such as a user operation event, an event produced by a hardware timer or the like at a specific time or after the lapse of a predetermined period, or an event caused by an interrupt occurring in response to a specific state attained by specific hardware is generated, an application receives the event with an event handler and performs appropriate processing corresponding to the generated event.

CITATION LIST

Patent Literature
Patent Literature 1: Japanese Patent Application Laid-Open No. 04-345248

SUMMARY OF INVENTION

Technical Problem

Meanwhile, mobile devices such as cellular phones are capable of running applications which receive events with various event handlers in an application execution environment such as VM (Virtual Machine). During voice call or the like, on the other hand, the VM is suspended so as to stop temporarily, whereby events occurring in a mobile device, if any, are not delivered to the event handlers of applications.

All the events generated in the mobile device during when the VM is in a suspended state are stored into an event queue, and thereafter all the events stored in the event queue are continuously passed to the VM at once when the VM resumes from the suspended state.

This has been problematic in that, for example, when the same events are stored redundantly in an event queue, an application may invoke the same event handler continuously when resuming from a suspended state, whereby the same processing operation is executed continuously.

Hence, there has conventionally been a problem that, for making an application, it is required to take account of the fact that unnecessary or unexpected events are serially passed to the VM at once when the VM resumes.

The technique disclosed in Patent Literature 1 is problematic in that, since the priority reference value varies depending on the amount of events occurring in the system, cases where event handlers of specific events are not executed must be taken into consideration when making an application, which raises the cost for making the application, thereby hindering rich contents from being circulated.

It is therefore an object of the present invention to provide an event queue managing device and an event queue managing method which can prevent unnecessary events from executing applications continuously when an application execution environment resumes from the suspended state.

Solution to Problem

The event queue managing device in accordance with the present invention is an event queue managing device for managing a queue of an event when an application operable in an application execution environment carries out processing upon occurrence of the event, the event queue managing device comprising queue managing means for storing a generated event in a queue and managing the queue of the event; event classification detection means for detecting an event classification of the event whose queue is managed by the queue managing means; stop state detection means for detecting a stop state of the application execution environment; and event deletion means for retrieving, when the stop state of the application execution environment is detected by the stop state detection means, according to the event classification of the event detected by the event classification detection means an unnecessary event from events stored in the queue by the queue managing means and deleting the unnecessary event.

The event queue managing method in accordance with the present invention is an event queue managing method for managing a queue of an event when an application operable in an application execution environment carries out processing upon occurrence of the event, the event queue managing method comprising a queue managing step of storing a generated event in a queue and managing the queue of the event; an event classification detection step of detecting an event classification of the event whose queue is managed by the queue step; a stop state detection step of detecting a stop state of the application execution environment; and an event deletion step of retrieving, when the stop state of the application execution environment is detected by the stop state detection step, according to the event classification of the event detected by the event classification detection step an unnecessary event from events stored in the queue by the queue managing step and deleting the unnecessary event.

In the event queue managing device and event queue managing method in accordance with the present invention, a generated event is stored in a queue and managed in terms of queue. When an application execution environment falls into a stop state, unnecessary events in events stored in the queue are retrieved according to the event classification and deleted, so that the unnecessary events can be prevented from executing applications continuously when the application execution environment resumes from a suspended state which is a stop state, whereby electricity can be saved. Also, since it is unnecessary to take account of unnecessary events continuously executing applications when making applications, the cost for making the applications can be cut down.

Preferably, in this case, the event queue managing device further comprises new event detection means for detecting occurrence of a new event, while the event deletion means deletes the unnecessary event when an event is newly detected by the new event detection means. In this event queue managing device, an unnecessary event is deleted from the queue each time an event is newly generated, whereby the queue is always free of unnecessary events. Therefore, regardless of when the application execution environment resumes, unnecessary events can be prevented from executing applications continuously.

Preferably, from the events stored in the queue, the event deletion means deletes an event having the same event classification as that of a newly generated event. From the events stored in the queue, an event having the same event classification as that of a newly generated event is deleted by this event queue managing device, whereby the same events can be prevented from executing applications continuously when the application execution environment resumes.

Advantageous Effects of Invention

The present invention can prevent unnecessary events from executing applications continuously when an application execution environment resumes from a stop state.

DESCRIPTION OF EMBODIMENTS

Figure 1:
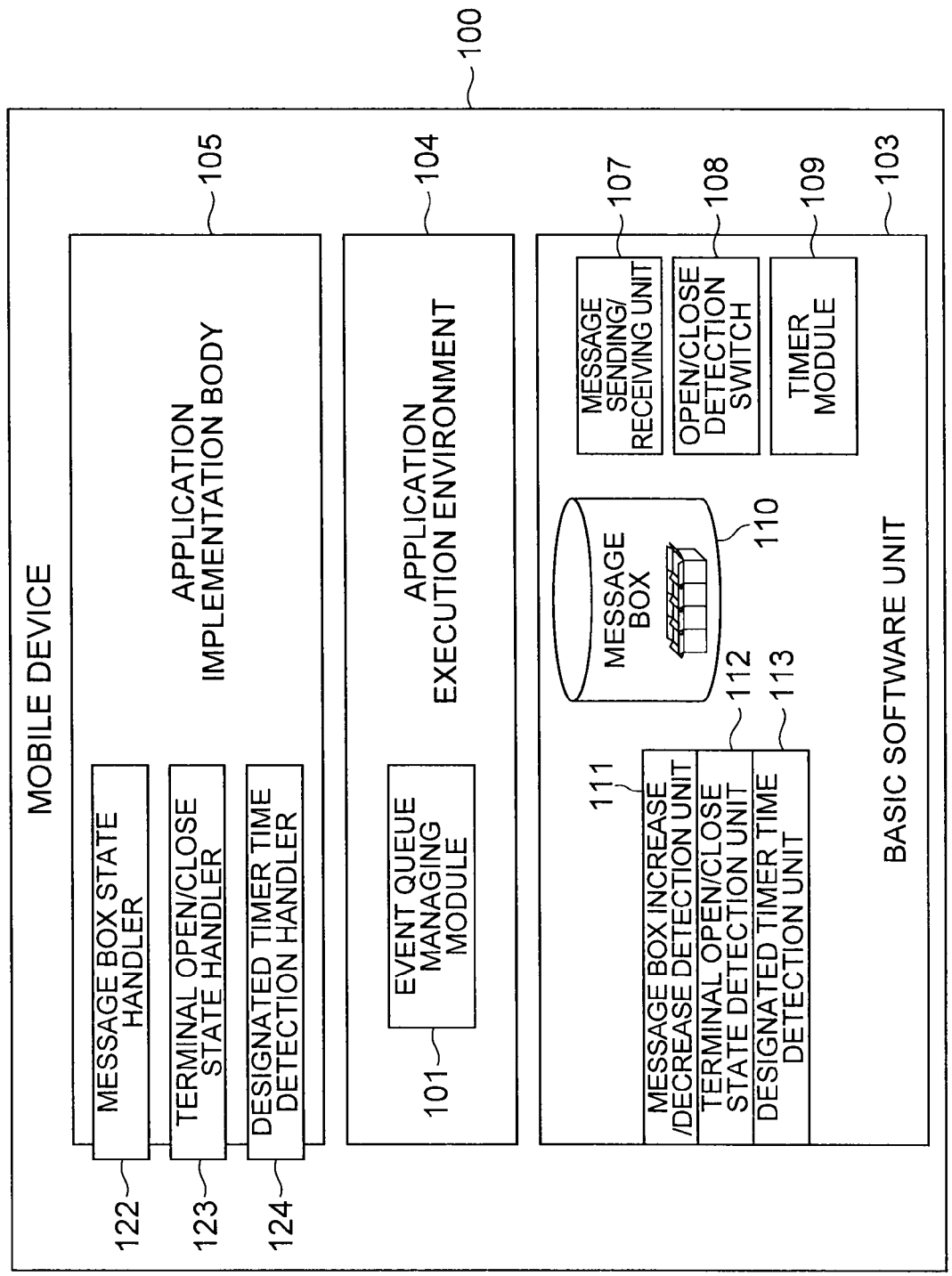
FIG. 1 is a structural diagram of a mobile device mounted with an event queue managing module in accordance with an embodiment.

In the following, embodiments of the event queue managing device and event queue managing method in accordance with the present invention will be explained in detail with reference to the drawings. The embodiments will be explained while assuming that an event queue managing module in accordance with the present invention is employed in a mobile device such as a cellular phone. In the drawings, the same constituents will be referred to with the same signs while omitting their overlapping descriptions.

FIG. 1 is a structural diagram of a mobile device mounted with an event queue managing module in accordance with an embodiment. As illustrated in FIG. 1, the event queue managing module 101 in accordance with this embodiment is mounted in a mobile device 100. The mobile device 100 has a folding structure which is adapted to open and close. The mobile device 100 is provided with a basic software unit 103, an application execution environment 104, and an application implementation body 105.

The basic software unit 103 is built in with basic software for achieving various functions of the mobile device 100. The basic software unit 103 is provided with a message sending/receiving unit 107, an open/close detection switch 108, a timer module 109, and a message box 110 as lower layers, and a message box increase/decrease detection unit 111, a terminal open/close state detection unit 112, and a designated timer time detection unit 113 as event detection means for detecting events generated in the lower layers.

The message sending/receiving unit 107 sends/receives mails and messages to/from the outside of the mobile device 100. Upon sending/receiving a mail or message, the message sending/receiving unit 107 stores the sent/received mail or message into the message box 110.

The open/close detection switch 108 detects changes in the open/close state of the mobile device 100 by monitoring a switch sensor attached to a hinge part or the like of the mobile device 100.

The timer module 109 sends an interrupt signal upon detecting that a designated time has come according to a real-time clock mounted therewithin.

The message box 110 is a storage device for storing the mails and messages sent/received by the message sending/receiving unit 107. The message box 110 manages the stored mails and messages on a folder-by-folder basis.

The message box increase/decrease detection unit 111 is an event detection means for detecting that the mails stored in the message box 110 have increased or decreased on a folder-by-folder basis. Upon detecting an event that the mails have increased/decreased in a folder, the message box increase/decrease detection unit 111 reports an event object whose event classification is "message box event" to the application execution environment 104.

The terminal open/close state detection unit 112 is an event detection means for detecting that the form of the mobile device 100 has changed from close to open or vice versa. Upon detecting an event that the open/close state of the mobile device 100 has changed, the terminal open/close state detection unit 112 reports an event object whose event classification is "mobile device open change event" or "mobile device close change event" to the application execution environment 104.

The designated timer time detection unit 113 is an event detection means for detecting that a designated time has come by utilizing the timer module 109 in response to a request from an upper-layer application. Upon detecting an event that the designated time has come, the designated timer time detection unit 113 reports an event object whose event classification is "designated time event" to the application execution environment 104.

Figure 2:
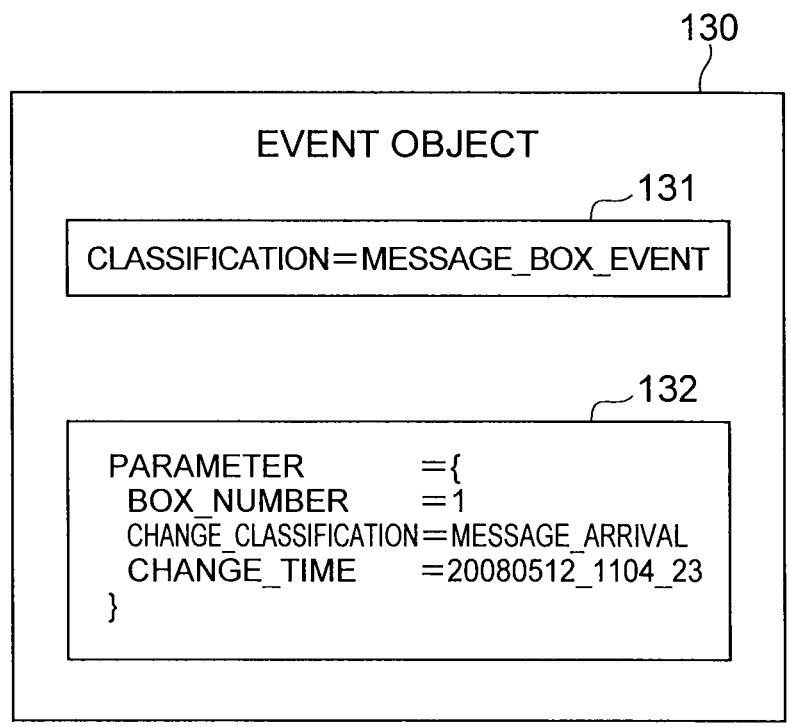
FIG. 2 is a diagram illustrating a structural example of an event object.

FIG. 2 is a diagram illustrating a structural example of an event object. As illustrated in FIG. 2, an event object 130 reported from any of the event detection means 111 to 113 of the basic software unit 103 is constituted by a classification managing part 131 and a parameter part 132. Information indicating the event classification is described in the classification managing part 131, so as to show by which detection unit of the basic software unit 103 the event is generated. Information belonging to the event is described in the parameter part 132 according to a structure defined for each classification of events. In the event object 130 illustrated in FIG. 2, "message box event" is written in the classification managing part 131, while the parameter part 132 is described with a parameter that a message arrived at box number 1 of the message box 110 at 11:04:23 on May 12, 2008. The box number of the parameter part 132 corresponds to a folder of the message box 110.

As illustrated in FIG. 1, the application implementation body 105 is a body part of an application implementation adapted to run on the application execution environment 104 and can acquire various events through event handlers. The event handlers are made to be called by the application execution environment 104 (i.e., executed by the application execution environment 104) when events occur. The application implementation body 105 is provided with a message box state handler 122, a terminal open/close state hander 123, and a designated timer time detection handler 124 as the event handlers.

Upon occurrence of an event that mails have increased/decreased on a folder-by-folder basis in the message box 110, the message box state handler 122 is called by the application execution environment and performs processing for reporting that the mails have increased/decreased in the folder to an application.

Upon occurrence of an event that the open/close state of the mobile device 100 has changed, the terminal open/close state hander 123 performs processing for reporting the change in the open/close state to an application and modifying a behavior of the application.

Upon occurrence of an event that a designated time has come, the designated timer time detection handler 124 reports the fact that the designated time has come to an application. The application having received the report can call processing for generating an alarm sound, for example.

The application execution environment 104, which is an execution environment operable on the basic software built into the basic software unit 103, is a VM (Virtual Machine) for running the application implementation body 105. That is, the application execution environment 104 calls the event handlers 122 to 124 when their corresponding event objects 130 are reported from the event detection means of the basic software unit 103 (the message box increase/decrease detection unit 111, terminal open/close state detection unit 112, and designated timer time detection unit 113 therewithin). The application execution environment 104 is usually in such a state that the event handlers 122 to 124 can receive events, but temporarily falls into a suspended state (stop state) in which the event handlers 122 to 124 cannot receive events during voice call or the like. The application execution environment 104 is provided with the event queue managing module 101 for managing the queue of the event object 130 reported from the basic software unit 103.

Figure 3:
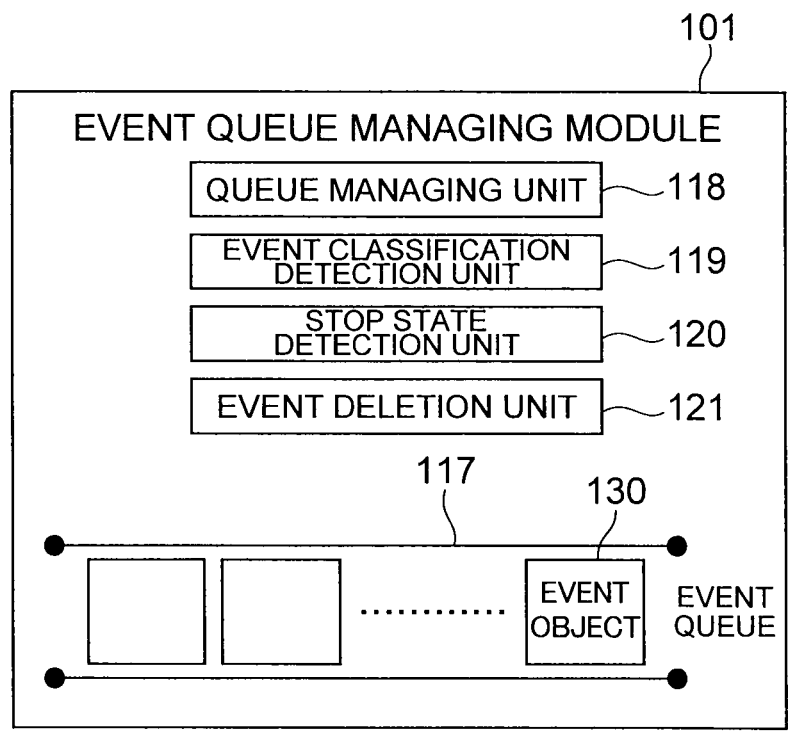
FIG. 3 is a diagram illustrating a structure of an event queue managing module.

FIG. 3 is a diagram illustrating the structure of the event queue managing module. As illustrated in FIG. 3, the event queue managing module 101 is provided with an event queue 117 which stores the event objects 130 reported from the event detection means (message box increase/decrease detection unit 111, terminal open/close state detection unit 112, and designated timer time detection unit 113) of the basic software unit 103. The event queue managing module 101 is equipped with respective functions of a queue managing unit 118, an event classification detection unit 119, a stop state detection unit 120, and an event deletion unit 121.

The queue managing unit 118 stores the event objects 130 reported from the event detection means (message box increase/decrease detection unit 111, terminal open/close state detection unit 112, and designated timer time detection unit 113) of the basic software unit 103 into the event queue in order of occurrence of the events and manages their queue.

The event classification detection unit 119 detects the event classifications and parameters of the event objects 130 whose queue is managed by the queue managing unit 118. That is, when a new event object 130 is reported from any of the event detection means 111 to 113 of the basic software unit 103, the event classification detection unit 119 detects the classification and parameter of the newly generated event with reference to the classification managing part 131 and parameter part 132 of this event object 130. When the object 130 illustrated in FIG. 2 is a newly generated event, for example, it is detected that the classification of the event is the message box event and that the parameter is the arrival of a message at box number 1. Then, when the event object 130 is stored into the event queue 117, the event classification detection unit 119 registers the event classification and parameter of the event object 130 as queue management information of the queue managing unit 118.

By monitoring the execution state of the application execution environment 104, the stop state detection unit 120 detects that the application execution environment 104 is in a stop state.

When the application execution environment 104 is in the stop state, the event deletion unit 121 deletes specific unnecessary event objects 130 from the event objects 130 stored in the event queue 117. That is, when the stop state detection unit 120 detects the arrival of an event in the case where the application execution environment 104 is in the stop state, the event deletion unit 121 retrieves and deletes a specific unnecessary event object 130 from the event objects 130 stored in the event queue 117 with reference to the event classification and parameter of the event object 130 registered by the event classification detection unit 119. An example of the specific event object 130 is an event object 130 whose event classification is the same as that of the new event object 130 but it is meaningless to store a plurality of such objects in the event queue 117.

Figure 4:
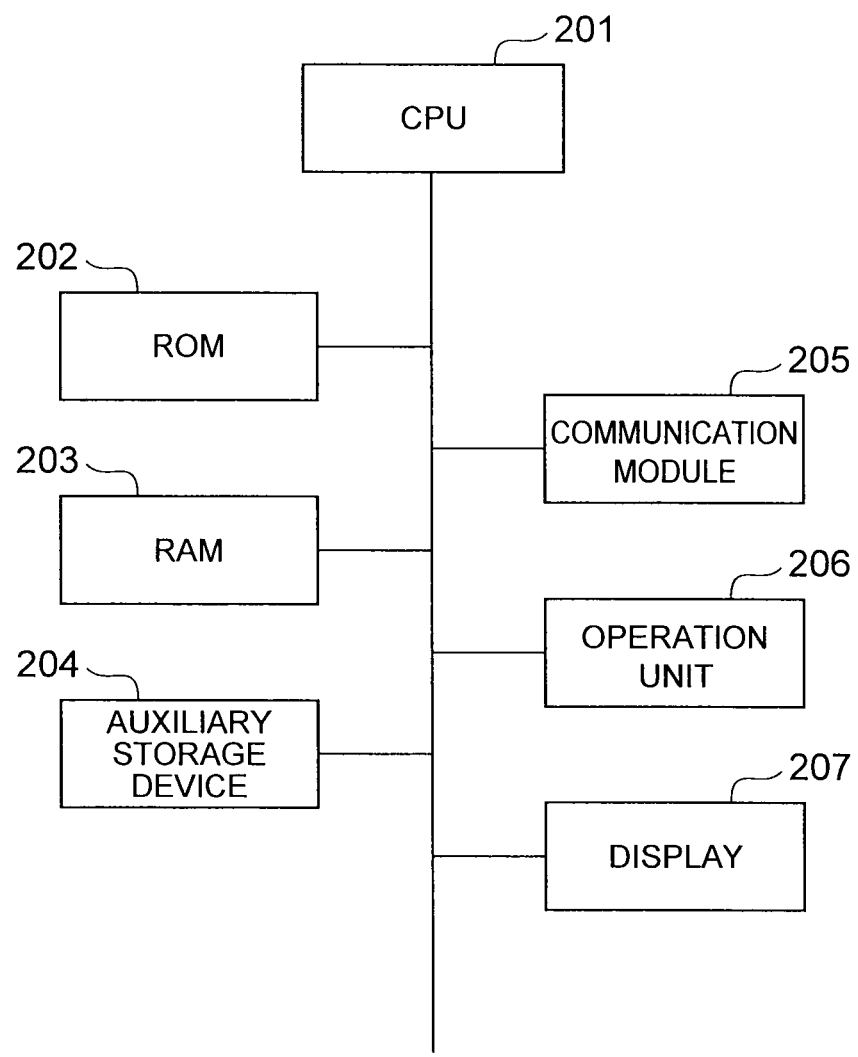
FIG. 4 is a diagram exemplifying a hardware structure of a mobile device.

FIG. 4 is a diagram exemplifying a hardware structure of the mobile device. As illustrated in FIG. 4, the mobile device 100 physically comprises a CPU 201, a ROM 202, a RAM 203, an auxiliary storage device 204, a communication module 205, an operation unit 206, and a display 207. The event queue managing module 101 acts as a function of the mobile device 101, while the functions explained in FIG. 3 are achieved by causing the CPU 201 and RAM 203 illustrated in FIG. 4 to read predetermined computer software thereonto, so as to operate the communication module 205 under the control of the CPU 201 and read and write data in the RAM 203 and auxiliary storage device 204.

Figure 5:
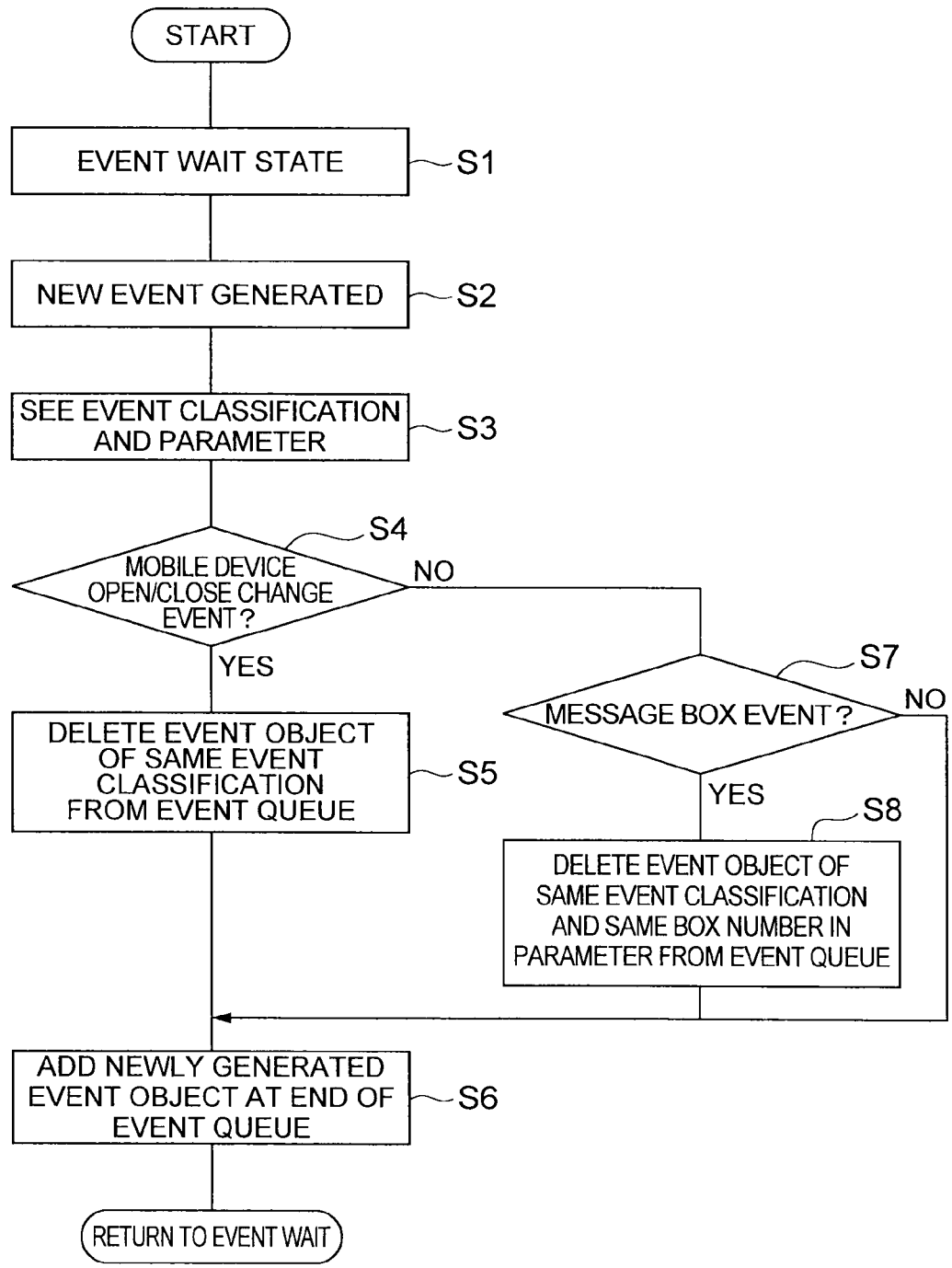
FIG. 5 is a flowchart for explaining processing operations of the event queue managing module.

Processing operations of the event queue managing module 101 in accordance with this embodiment will now be explained with reference to FIG. 5. FIG. 5 is a flowchart for explaining processing operations of the event queue managing module. FIG. 5 illustrates processing operations in the case where the application execution environment 104 is in a suspended state, e.g., when the mobile device 100 performs voice call.

As illustrated in FIG. 5, when the application execution environment 104 falls into the suspended state, the event queue managing module 101 attains an event wait state, so as to wait until an event newly occurs (step S1).

When an event is generated in the basic software unit 103, the event queue managing module 101 is notified of an event object 130 from any of the event detection means 111 to 113 (step S2).

Subsequently, the event queue managing module 101 sees the classification and parameter of the generated event (step S3). That is, at step S3, the event classification detection unit 119 sees the classification and parameter of the newly generated event by referring to the classification managing part 131 and parameter part 132 of the event object 130 reported at step S2.

Then, the event queue managing module 101 determines whether or not the event classification is the mobile device open/close change event (step S4).

When it is determined at step S4 that the event classification is the mobile device open/close change event (step S4: YES), the event queue managing module 101 proceeds to step S5, where the event deletion unit 121 deletes from the event objects 130 stored in the event queue 117 an event object 130 whose event classification is the same as that of the newly generated event (step S5). As mentioned above, the event classification detection unit 119 registers the event classification as queue management information when storing the event object 130 into the event queue 117. Therefore, by comparing the event classification registered in the queue management information with the event classification of the newly generated event determined at step S3, step S5 retrieves and deletes from the event objects 130 stored in the event queue 117 the event object 130 whose event classification is the same as that of the newly generated event.

Then, the event queue managing module 101 additionally stores the event object 130 of the newly generated event at the end of the event queue 117 (step S6). As a consequence, among the event objects 130 stored in the event queue 117, only the event object 130 additionally stored at the end is the event object 130 of the event that the open/close state of the mobile device 100 has changed.

When it is determined at the above-mentioned step S4 that the event classification is not the mobile device open/close change event (step S4: NO), on the other hand, the event queue managing module 101 proceeds to step S7 and determines whether or not the event classification is the message box event (step S7).

When it is determined at step S7 that the event classification is the message box event (step S7: YES), the event queue managing module 101 proceeds to step S8, where the event deletion unit 121 deletes from the event objects 130 stored in the event queue 117 an event object 130 whose event classification and parameter are the same as those of the newly generated event (step S8). As mentioned above, the message box 110 manages the increase and decrease of mails on a folder-by-folder basis, so that different folders in which mails have increased or decreased are considered to be different events even when they have the same event classification. Therefore, step S7 retrieves and deletes from the event objects 130 stored in the event queue 117 the event object 130 having the same event classification and the same box number in the parameter (the same folder in which mails have increased or decreased) as with the newly generated event. When the box number and change classification in the parameter of one event object 130 (see FIG. 2) are the same as those in the parameter of the other, it is determined at step S8 that their parameters are the same even if their change times are different from each other.

Then, the event queue managing module 101 additionally stores the event object 130 of the newly generated event at the end of the event queue 117 (step S6). As a consequence, among the event objects stored in the event queue 117, only the event object 130 additionally stored at the end is the event object 130 of the event that mails have increased or decreased in the same folder (box number).

When it is determined at step S7 that the event classification is not the message box event (step S7: NO), on the other hand, the event queue managing module 101 proceeds to step S6 and additionally stores the event object 130 of the newly generated event at the end of the event queue 117 (step S6).

Thus, when the application execution environment 104 falls into the suspended state, the event object of a newly generated event is stored into the event queue 117 and managed in terms of queue by the event queue managing module 101 in accordance with this embodiment, while a specific unnecessary event object 130 is deleted from the event objects 130 stored in the event queue 117. Therefore, when the application execution environment 104 resumes from the suspended state, the event handlers 122 to 124 can be prevented from being called by the unnecessary event object 130 and thereby continuously executing applications. Hence, when making applications, it is unnecessary to take account of the same event handlers 122 to 124 continuously called by the unnecessary event object 130, so that a code for nullifying the handler of the latter of two events generated in series can be omitted, for example, whereby costs for making and testing the applications can be cut down.

Since an unnecessary event object 130 is deleted from the event queue each time an event is newly generated, the event queue 117 is always free of unnecessary events. Therefore, regardless of when the application execution environment 104 resumes from the suspended state, event handlers can be prevented from being called by the unnecessary event objects 130 and thereby continuously executing applications.

Also, the event object 130 having the same event classification as that of the newly generated event is deleted from the event objects 130 stored in the event queue and thus can be prevented from calling event handlers and continuously executing applications when the application execution environment 104 resumes from the suspended state.

The present invention has been explained specifically with reference to its embodiment in the foregoing but is not limited thereto. For example, though the above-mentioned embodiment has been explained as one in which three kinds of events are generated, and their corresponding processing operations are executed by applications, the contents and number of classifications of events and details of processing by the applications are not limited in particular. Depending on the event classification and details of processing by the applications, the event queue managing module 101 may appropriately change criteria for deleting the event objects 130 stored in the event queue 117.

Though the above-mentioned embodiment deletes the event object 130 whose event classification is the same as that of the new event object 130 as an unnecessary event, related or similar event classifications may be registered in groups, for example, and the event object 130 whose event classification is related or similar to that of the new event object 130 may be deleted as an unnecessary event with reference to the registered information.

Though the above-mentioned embodiment has been explained as one in which the event queue managing module 101 is provided in the application execution environment 104, it may be provided in the basic software unit 103, the application implementation body 105, or the like, or independently in the mobile device 100, for example.

Reference Signs List

100 . . . mobile device; 101 . . . event queue managing module; 103 . . . basic software unit; 104 . . . application execution environment; 105 . . . application implementation body (application); 107 . . . message sending/receiving unit; 108 . . . open/close detection switch; 109 . . . timer module; 110 . . . message box; 111 . . . message box increase/decrease detection unit; 111 . . . message box increase/decrease detection unit; 112 . . . terminal open/close state detection unit; 113 . . . designated timer time detection unit; 117 . . . event queue; 118 . . . queue managing unit; 119 . . . event classification detection unit; 120 . . . stop state detection unit; 121 . . . event deletion unit; 122 . . . message box state handler; 123 . . . terminal open/close state handler; 124 . . . designated timer time detection handler; 130 . . . event object; 131 . . . classification managing part; 132 . . . parameter part

The invention claimed is:

1. An event queue managing device in a mobile device for managing a queue of an event, wherein the mobile device receives the event from a plurality of event handlers provided in accordance with an event classification upon occurrence of the event and notifies an application that is executed in an application execution environment, the event queue managing device comprising:

queue managing means for storing a generated event in the event queue and managing the event queue;

event classification detection means for detecting an event classification of the event in the event queue managed by the queue managing means;

stop state detection means for detecting a stop state of the application execution environment wherein the event handler cannot receive the event;

a new event detection means for detecting a newly generated event, the newly generated event is detected when the stop state of the application execution environment is detected by the stop state detection means; and event deletion means for deleting an event having the same event classification as that of the newly generated event, as an unnecessary event, from events stored in the event queue by the queue managing means, by referring to the event classification of the event detected by the event classification detection means when the newly generated event is detected by the new event detection means, when the stop state of the application execution environment is detected by the stop state detection means, wherein the queue managing means additionally stores the newly generated event in the event queue, after the unnecessary event is deleted by the event deletion means; and wherein the event classification of the event comprises a message box event, a mobile device open change event, a mobile device close change event or a designated time event.

2. The event queue managing device according to claim 1, wherein the event classification detection means detects the event classification and parameter of the event managed by the queue managing means, and the event deletion means deletes an event having the same event classification and parameter as that of the newly generated event, as an unnecessary event, from events stored in the event queue by the queue managing means, by referring to the event classification and parameter of the event detected by the event classification detection means when the newly generated event is detected by the new event detection means, when the stop state of the application execution environment is detected by the stop state detection means.

3. An event queue managing method executed in a mobile device for managing a queue of an event, wherein the mobile device receives the event from a plurality of event handlers provided in accordance with an event classification upon occurrence of the event and notifies an application that is executed in an application execution environment, the event queue managing method comprising:

storing a generated event in the event queue and managing the event queue of the event;

detecting an event classification of the event in the managed event queue;

detecting a stop state of the application execution environment wherein the event handler cannot receive the event;

detecting a newly generated event, the newly generated event is detected when the stop state of the application execution environment is detected in the stop state detecting step; and an event deletion step of retrieving and deleting an event having the same classification as that of the newly generated event, as an unnecessary event, from events stored in the event queue by referring to the event classification of the event detected when the newly generated event is detected, when the stop state of the application execution environment is detected wherein the newly generated event is additionally stored in the event queue, after the unnecessary event is deleted; and wherein the event classification of the event comprises a message box event, a mobile device open change event, a mobile device close change event or a designated time event.

* * * * *